(12) United States Patent
Idelevitch et al.

(10) Patent No.: US 12,307,539 B2
(45) Date of Patent: May 20, 2025

(54) METHOD FOR OPERATING A TRANSPORT SYSTEM AND CORRESPONDING TRANSPORT SYSTEM

(71) Applicant: AUDI AG, Ingolstadt (DE)

(72) Inventors: Vladimir Idelevitch, Nuremberg (DE); Maximilian Ertl, Ingolstadt (DE); Stephan Beutler, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 140 days.

(21) Appl. No.: 15/935,425

(22) Filed: Mar. 26, 2018

(65) Prior Publication Data

US 2018/0300836 A1 Oct. 18, 2018

(30) Foreign Application Priority Data

Apr. 12, 2017 (DE) .............................. 102017206291

(51) Int. Cl.
| | | |
|---|---|---|
| *G06Q 50/40* | (2024.01) | |
| *G06Q 10/0631* | (2023.01) | |
| *G06Q 10/0835* | (2023.01) | |

(52) U.S. Cl.
CPC ....... *G06Q 50/40* (2024.01); *G06Q 10/06315* (2013.01); *G06Q 10/0835* (2013.01)

(58) Field of Classification Search
CPC . G06Q 50/30; G06Q 10/06315; B62D 47/006
See application file for complete search history.

(56) References Cited

U.S. PATENT DOCUMENTS

| | | | |
|---|---|---|---|
| 5,437,536 A | 8/1995 | Bianca | |
| 6,139,250 A | 10/2000 | Nolasco | |
| 7,648,320 B2 | 1/2010 | Valli | |
| 7,838,782 B2 | 11/2010 | Hamilton et al. | |
| 9,437,058 B2* | 9/2016 | Luke | B60L 50/66 |
| 9,454,157 B1* | 9/2016 | Hafeez | G05D 1/104 |
| 9,715,232 B1* | 7/2017 | Fischer | B66F 9/063 |
| 9,778,653 B1* | 10/2017 | McClintock | G06Q 10/08 |
| 9,786,154 B1* | 10/2017 | Potter | B60W 40/08 |
| 9,940,840 B1* | 4/2018 | Schubert | G06Q 30/06 |
| 10,042,359 B1* | 8/2018 | Konrardy | B60P 3/12 |
| 10,222,798 B1* | 3/2019 | Brady | G06Q 10/0832 |
| 11,480,958 B2* | 10/2022 | Paczan | B64D 31/06 |
| 2004/0265105 A1 | 12/2004 | Seifried et al. | |
| 2010/0054904 A1 | 3/2010 | Stidd | |

(Continued)

FOREIGN PATENT DOCUMENTS

| | | |
|---|---|---|
| CN | 101489857 A | 7/2009 |
| CN | 103608202 A | 2/2014 |

(Continued)

OTHER PUBLICATIONS

Amanatiadis, Angelos, et al. "Autonomous vehicle emergency recovery tool: a cooperative robotic system for car extraction." (2016) . Journal of Field Robotics 33.8: 1058-1086. (Year: 2016).*

(Continued)

*Primary Examiner* — Sara Grace Brown
(74) *Attorney, Agent, or Firm* — Maier & Maier, PLLC

(57) ABSTRACT

A method for operating a transport system, which has a large number of transport mechanisms, and a corresponding transport system.

11 Claims, 1 Drawing Sheet

(56) References Cited

U.S. PATENT DOCUMENTS

| | | | |
|---|---|---|---|
| 2011/0170994 A1 | 7/2011 | Coombs et al. | |
| 2012/0215393 A1 | 8/2012 | Schiedegger | |
| 2012/0239224 A1* | 9/2012 | McCabe | B66F 9/063 |
| | | | 701/2 |
| 2013/0261953 A1* | 10/2013 | Kiyama | G01C 21/3469 |
| | | | 701/400 |
| 2014/0089206 A1* | 3/2014 | Hyde | G06Q 50/06 |
| | | | 705/80 |
| 2014/0365258 A1* | 12/2014 | Vestal | G05D 1/0297 |
| | | | 901/1 |
| 2015/0199619 A1* | 7/2015 | Ichinose | G01C 21/3469 |
| | | | 705/5 |
| 2015/0274421 A1* | 10/2015 | Yamada | B25J 11/0005 |
| | | | 700/218 |
| 2016/0027307 A1* | 1/2016 | Abhyanker | G06Q 50/01 |
| | | | 701/117 |
| 2016/0055743 A1* | 2/2016 | Raj | G08G 1/202 |
| | | | 701/22 |
| 2016/0092962 A1* | 3/2016 | Wasserman | H04M 3/487 |
| | | | 705/26.7 |
| 2016/0117853 A1* | 4/2016 | Zhong | G01C 21/00 |
| | | | 345/634 |
| 2016/0334797 A1* | 11/2016 | Ross | G05D 1/0234 |
| 2017/0123421 A1* | 5/2017 | Kentley | G06Q 10/00 |
| 2017/0151884 A1* | 6/2017 | Khosravi | B60L 50/15 |
| 2017/0168493 A1* | 6/2017 | Miller | G01C 21/3682 |
| 2017/0192437 A1* | 7/2017 | Bier | G05D 1/0016 |
| 2017/0316379 A1* | 11/2017 | Lepek | G06Q 10/08 |
| 2018/0012198 A1* | 1/2018 | Ricci | B60L 53/665 |
| 2018/0022405 A1* | 1/2018 | Gecchelin | G05D 1/0088 |
| | | | 701/23 |
| 2018/0060776 A1* | 3/2018 | Ahmed | G07C 5/0808 |
| 2018/0081360 A1* | 3/2018 | Bostick | G06Q 10/04 |
| 2018/0333847 A1* | 11/2018 | Ma | B25J 9/163 |
| 2019/0028903 A1* | 1/2019 | Carpenter | H04W 16/26 |
| 2019/0135113 A1* | 5/2019 | Koo | G05D 1/0094 |
| 2019/0385461 A1* | 12/2019 | Blomstrand | B62D 53/0864 |
| 2020/0317074 A1* | 10/2020 | Miller | G01C 21/3664 |

FOREIGN PATENT DOCUMENTS

| | | |
|---|---|---|
| CN | 104583053 A | 4/2015 |
| CN | 204355017 U | 5/2015 |
| DE | 20306290 U1 | 8/2004 |
| DE | 102005057652 A1 | 8/2007 |
| DE | 10 2015 205 032 A1 | 9/2016 |
| EP | 1551679 B1 | 7/2006 |
| EP | 2062837 A1 | 5/2009 |
| EP | 2086837 B1 | 12/2012 |
| EP | 2614198 B1 | 1/2015 |
| JP | S60-47747 A | 3/1985 |
| WO | 85/01265 A1 | 3/1985 |
| WO | 2004/045932 A1 | 6/2004 |
| WO | 2005118436 A1 | 12/2005 |
| WO | 2013/054012 A1 | 4/2013 |
| WO | 2016/161216 A1 | 10/2016 |

OTHER PUBLICATIONS

Kashiwazaki, Koshi, et al. "A car transportation system using multiple mobile robots: iCART II." 2011 IEEE/RSJ International Conference on Intelligent Robots and Systems. IEEE, 2011. (Year: 2011).*

Examination Report issued on Feb. 20, 2020 in corresponding European Application No. 18 160 073.5; 6 pages Including partial machine-generated English-language translation.

European Search Report dated May 11, 2018, in connection with corresponding EP Application No. 18160073.5 (8 pgs.).

German Examination Report, dated Apr. 9, 2018, in corresponding German application No. 102017206291.6; 12 pgs.

Chinese Office Action issued on May 7, 2021, in connection with corresponding CN Application No. 201810320247.X (13 pp., including machine-generated English translation).

* cited by examiner

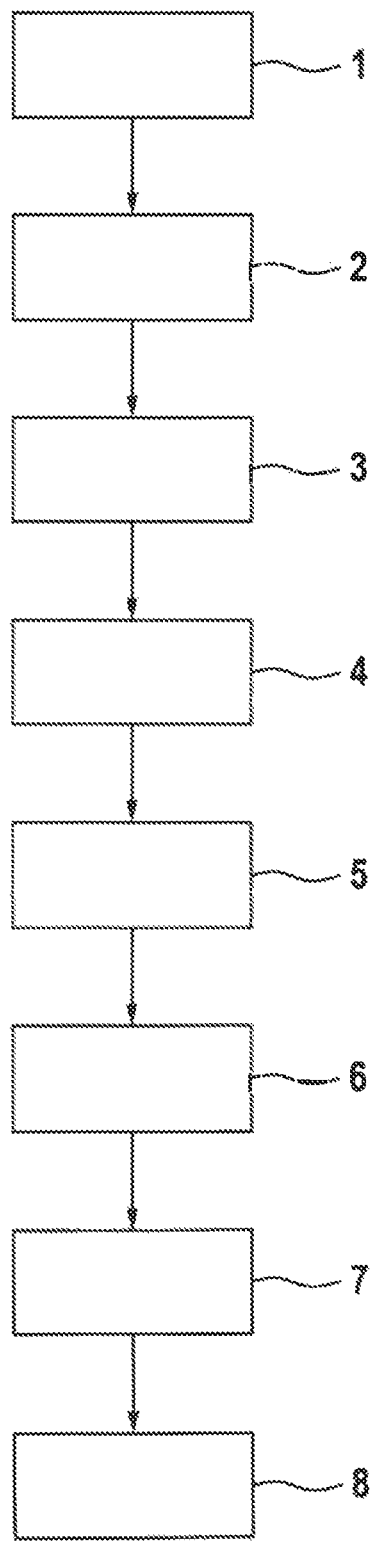

METHOD FOR OPERATING A TRANSPORT SYSTEM AND CORRESPONDING TRANSPORT SYSTEM

FIELD

The invention relates to a method for operating a transport system, which has a large number of transport means. The invention further relates to a corresponding transport system.

BACKGROUND

For some time, it has been observed that the constraints for mobility are changing dramatically and quickly. This applies, in particular, to urban mobility, that is, to mobility relating to cities. This change results, for example, from lack of space, which leads particularly to traffic jams, as well as from emissions of conventional vehicles, which are usually operated with combustibles or fuels. Even today, conventional motor vehicles are no longer permitted to drive or at least only permitted to drive with restrictions in some urban areas. In order to adjust to this change in mobility, new concepts are required, which, in particular, make possible an individual and seamless mobility.

SUMMARY

Therefore, the object of the invention is to propose a method for operating a transport system, which, in comparison to known methods, has advantages and, in particular, makes possible such an individual and seamless mobility for the load, particularly for a load of any kind.

This is achieved according to the invention with a method for operating a transport system. The transport system has a large number of particularly emission-free transport means that can move independently of one another and are assembled into a total set of transport means. When a transport means request arrives at a central control unit, a number of transport means that, depending on a load to be transported, is sufficient to carry out the transport as well as one associated transport starting location or a plurality of associated transport starting locations is/are determined and a number of transport means that corresponds to the number of transport means is selected from the total set of transport means, assigned to a subset of transport means, and autonomously conveyed to the transport starting location or locations, wherein, after the transport starting location or locations has/have been reached, the transport of the load to one or a plurality of transport destination locations is carried out and, after the transport destination location or locations has/have been reached by the one or more transport means, the subset of transport means is cancelled.

The transport system serves for the transport of the load. The load can fundamentally be of any kind and is governed by the requirements placed on the transport system. For example, the load is present in the form of a transported cargo and/or of at least one living being, wherein the latter is understood to mean at least one person and/or at least one animal. If the transport system serves for the transporting of the transported cargo for a fee, then the transported cargo can also be referred to as freight. The transported cargo itself or the freight can likewise be present in any form—for example, as containerized cargo, liquid cargo, grab-handled cargo, bulk goods, suction cargo, bulk material, or piece goods.

The transport system or the transport means is adapted or at least can be adapted to the load or to the transported cargo. In the case of containerized cargo, this means, for example, that the transport means is designed for the transporting of a container that receives the containerized cargo. If the load is present in the form of the at least one living being, then the transport system or the transport means has, for example, a corresponding transport compartment or can be expanded by such a transport compartment. The transport compartment is present, for example, in the form of a passenger compartment. Alternatively to the preferably closed transport compartment, it is obviously possible to provide an open conveyance space, that is, for example, a seating space. In the latter case, a seat is preferably associated with the transport means or is joined to it.

The transport system comprises the large number of transport means. The transport means can fundamentally differ from one another or can be constructed identically at least in part or in whole. Each of the transport means can be moved independently of any other of the transport means. This means preferably that each of the transport means can be operated completely autonomously; that is, for example, it travels or can travel autonomously and automatically, for example, to the transport starting location and/or the transport destination location that is/are assigned to it. For this purpose, the transport means are correspondingly designed; that is, they have, for example, means for implementing an autonomous or independent driving operation. These means can comprise, in particular, a navigation device, a route determination device, an environment recognition device, or the equivalent.

The transport means are preferably emission-free; that is, they produce no or nearly no exhaust during their operation. This is, for example, ensured by way of a purely electric drive of the transport means. Preferably, each of the transport means is equipped with at least one electrical machine for its drive as well as with a corresponding energy storage unit for the electrical energy needed for operating the drive. Additional requirements that are placed on the one or more transport means can ensue from safety regulations that may need to be observed where the operation is conducted, in particular, in the case that the transport means are to be capable of operation in the public area, preferably on public roads.

It is then provided that the transport means of the transport system are assembled into the total set of transport means. In this case, the total set of transport means is a logical assembly of all transport means of the transport system, regardless of where they are currently located. The transport means included in the total set of transport means can each be present, at least independently of one another, at different locations, at least in part at at least one location or at a plurality of locations or all can be at the same location, for example, at a common starting location. In any case, however, the transport means represent a part of the total set of transport means, even when they are distributed over a wide area.

If transport means request arrives at the central control unit, a request that, for example, is triggered by an operator and/or by an assistance device, then the subset of transport means is assembled, namely, from transport means that are included in the total set of transport means. The set of transport means is assembled in that, initially, the load that is to be transported is evaluated or analyzed and the number of transport means that is sufficient for carrying out the transport of the load is determined. From the total set of transport means, a number of transport means that corresponds to the transport means number is then chosen and assigned to the subset of transport means.

Preferably, during the selection or assignment, operating parameters or state parameters of the transport means are taken into consideration, in particular a current location of the transport means, an available range of travel, and the like. A suitability of the respective transport means for the transporting of the load can also be evaluated. For this purpose, for example, at least one loading parameter, such as the type of load or the kind of load, the weight of the load, and/or an existing transport device for the load, that is, for example, the transport compartment or the equivalent, is/are taken into consideration.

More preferably, an availability of the transport means or of the respective transport means is taken into consideration This means that transport means already assigned to another transport means subset are not selected and assigned to the subset of transport means, because they are not available at the time. Conversely, this means that the transport means assigned to the subset of transport means are identified as not being available and are not assigned to any other subset of transport means as long as this is the case, that is, as long as they are assigned to this subset of transport. Only when or after the subset of transport means is cancelled are the transport means that have been included thus far in the subset of transport means once again identified as being available and can correspondingly be assigned to the other subset of transport means.

Preferably, the central control unit receives, together with the transport means request, the information about the load that is to be transported and/or characteristic parameters of the load, that is, for example, the kind or the type, the volume, the weight or the mass, the number of persons, or the like. From this data, the central control unit can determine the number of transport means that is sufficient for carrying out the transport and can select the suitable transport means.

Additionally to the number of transport means, the transport starting location or the plurality of transport starting locations is/are determined. For example, the transport starting locations correspond here to all of the transport means assigned to the subset of transport means. However, it can also be provided that, for some of the transport means included in the subset of transport means or for all of these transport means, there are different transport starting locations. The transport starting location and/or the transport starting locations is/are preferably also parts of the transport means request or is/are transmitted together with it to the central control unit. The transport starting location or locations is/are predetermined in this way, for example, by the operator and/or the assistance device.

Following the assignment of the transport means to the subset of transport means, the transport means are autonomously conveyed to their respective transport starting location. The transport starting location pertinent to each transport means is thus transmitted to the transport means, after which the transport means autonomously heads toward its transport starting location. In this way, it may happen that the transport means are initially present at completely different locations and are subsequently conveyed to the same transport starting location or to different transport starting locations.

The conveyance is made autonomously, that is, without the influence of the operator and/or of the assistance device that has triggered the transport means request.

Instead, preferably, each of the transport means itself takes on its route planning, which leads it from its current location to the transport starting location. However, the route planning can also be taken on by the central control unit and, for example, can be transmitted to the respective transport means before the conveyance begins or when the conveyance begins. Each of the transport means is equipped for a completely autonomous transport operation or driving operation. In particular, in this regard, each of the transport means is equipped with a corresponding sensor device, in particular an environmental recognition device, which preferably has at least one environmental sensor or the equivalent.

If the transport means present in the subset of transport means have arrived at their respective transport starting location, then the load that is to be transported is picked up and the transport of the load to the transport destination location or to the plurality of transport starting locations is carried out. It is thereby provided, for example, that a plurality of transport means jointly transport the load to a common transport destination location. However, it can also be provided that, independently of one another, the transport means each pick up, at different transport starting locations, a part of the load and transport it to different transport destination locations or to the same transport destination location. Any variations can obviously also be realized. However, it is always important that the transport means are assigned to the subset of transport means, that is, are assigned logically to one another, in particular in the central control unit or in a memory unit of the central control unit.

After the transport destination location or locations has/ have been reached by the one or more transport means, the load is preferably deposited and, subsequently, the subset of transport means is cancelled. This means that, ultimately, the transport means included thus far in the subset of transport means are identified once again as being available, so that they can be assigned once again by the central control unit to a subset of transport means. The identification of the transport means as being available occurs, in turn, preferably in the central control unit or in the memory unit thereof, so that the availability of the individual transport means can be accessed centrally and checked as needed.

An approach of this kind makes possible an extremely flexible operation of the transport system, in particular the individual and seamless mobility already mentioned above. This is due, in particular, to the modularity of the transport system, the transport means of which can be assembled in any way and employed for the transport of the load. For example, it is therefore provided that a plurality of transport means are assigned to the subset of transport means and conveyed from the same starting location or from different starting locations to the same transport starting location. At this transport starting location, the transport means jointly pick up the load and also transport it jointly to the transport destination location. At this transport destination location, the load is deposited and the subset of transport means is cancelled once again. In this way, when a transport means request arrives at the central control unit, the number of transport means that is sufficient for carrying out the transport is always determined and this number of transport means is conveyed to the transport starting location or locations.

Provided that, in the scope of this description, the transport starting location or locations or the transport destination location or locations is/are addressed, preferably only exactly one transport starting location and/or only exactly one transport destination location is meant. However, an approach is also basically included in which the transport means are conveyed to a plurality of different transport starting locations and subsequently are translocated to a common transport destination location or in which the transport means are conveyed to a common transport starting location and subsequently conveyed to different transport destination locations. It can also be provided that the transport means are initially conveyed to different transport starting locations and subsequently to different transport destination locations.

The transport system finds use, for example, at an airport or in retail trade, in particular in a retail store or in a shopping center with a number of retail shops. When the transport system is used at an airport, it can be set up, for example, for the transportation of luggage and/or persons. More preferably, the luggage is conveyed by means of at least one transport means and an owner of the luggage is conveyed by at least one additional transport means, respectively, from a transport starting location to a transport destination location. The transport means and the additional transport means are therefore assigned to the same subset of transport means. Preferably, the same transport starting location or at least the same transport destination location is assigned to the transport means and to the additional transport means.

For example, the transport means serve for picking up luggage and its owner at a common transport starting location, for example, at a parking space. After the luggage and its owner have been picked up, they are transported usually via paths that are separate, at least in part, to separate transport destination locations, in particular to a luggage handling system for the luggage and to a passenger processing system for the owner.

If the transport system is designed for the retail trade, then it preferably serves for the transport of purchases that a user of the transport system has acquired. For this purpose, a transport means or a plurality of transport means can find use.

In the scope of another embodiment of the invention, it is provided that the transport means request specifies the load to be transported, the transport starting location or locations, as well as the transport destination location or locations. Reference to this has already been made above. In order for the central control unit to be able to determine the sufficient or necessary number of transport means, the load that is to be transported has to be specified. For this purpose, for example, together with the transport means request, the corresponding data are transmitted. This applies analogously to the transport starting location or locations as well as to the transport destination location or locations.

A preferred enhancement of the invention provides that the transport means for the subset of transport means are selected on the basis of a quantity of energy that is needed for reaching the transport starting location or locations or the transport destination location or locations and/or are selected on the basis of a respectively remaining residual quantity of energy of the transport means. In this way, the transport means are thus only assigned to the subset of transport means when the quantity of energy that is needed for reaching first the transport starting location and subsequently the transport destination location is less than the remaining residual quantity of energy of the respective transport means.

The residual quantity of energy defines the remaining range of travel of the one ore more transport means, that is, the distance that can still be traversed by this one or more transport means. In the determination of the needed quantity of energy, it is possible to draw upon, for example, a topology of the distance to be traveled between the transport starting location and the transport destination location, that is, for example, upgrades and/or downgrades along this distance. The current traffic situation can also enter into the determination of the needed quantity of energy. The residual quantity of energy after arrival of the transport means at the transport destination location can fundamentally be equal to or at least nearly zero. In this case, it is preferably provided for the transport means to be re-charged directly at the transport destination location or picked up from the transport destination location.

An enhancement of the invention provides that, in the selection of the transport means, additionally a distance of the transport destination location or locations from a maintenance device and/or charging device for the transport means is taken into consideration. The transport system comprises the at least one maintenance device and/or charging device. At said device, maintenance work, for example, necessary repairs, can be carried out on the transport means. Additionally or alternatively, it can be provided that the energy storage unit of the transport means is re-charged. In this case, electrical energy for re-charging the energy storage unit is supplied at the maintenance device and/or charging device.

In the selection of the transport means, it is then additionally taken into consideration whether, after their arrival at the transport destination location, that is, after the transport has been carried out, they still have available a residual quantity of energy that is then sufficiently large to drive successfully toward the maintenance device and/or charging device, that is, to reach them. Only when this is the case is the transport means assigned to the subset of transport means. Otherwise, another transport means is selected from the total set of transport means and assigned to the subset of transport means.

Alternatively or additionally, it is possible to take into consideration the energy state of the subset of transport means. In this way, it is conceivable that the individual transport means each have available residual energy quantities that differ from one another. Therefore, in the case that the transport means each do not have available a residual energy quantity that is sufficient to carry out the planned transport, but the total residual energy quantity of all transport means, that is, the residual energy quantity of the subset of transport means, is sufficient, then the transport means are capable of exchanging energy among one another. Thus, it is possible, for example, to use a transport means with a sufficient or a higher residual energy to charge a transport means that does not have a sufficient residual energy quantity. Similarly, an energy exchange with the load, preferably with the vehicle to be transported, is possible. Obviously, in any case, it is also possible to charge in the reverse direction.

Another preferred embodiment of the invention provides that a time of arrival of the selected transport means at the transport starting location or locations is calculated an displayed. After the arrival of the transport means request at the central control unit, the time of arrival is supplied here as information, and, for example, displayed to the operator or transmitted to the operator or to the assistance device. Additionally, it can be provided that the current location of the transport means that are included in the subset of transport means is displayed or transmitted to the operator and/or indicated or transmitted to the assistance device.

In the scope of another embodiment of the invention, it is provided that, prior to the conveyance of the selected transport means to the transport starting location or locations, a confirmation request is carried out, wherein, when a confirmation follows the confirmation request, the transport means are conveyed to the transport starting location or locations and, otherwise, the subset of transport means is cancelled. Initially, therefore, the number of transport means is determined and the subset of transport means is assembled.

Subsequently, data relating to the number of transport means and/or to the subset of transport means are supplied by the central control unit; for example, the data are displayed to the operator or transmitted to the operator. These data can comprise, for example, the time of arrival of the selected transport means, the costs for carrying out the transport, or similar information. Preferably, the confirmation request is carried out in this context, and has to be confirmed at the central control unit.

If this confirmation occurs, then the transport means are conveyed to the transport starting location or locations. If, otherwise, the confirmation does not occur or if an active cancellation is made at the central control unit, then the conveyance of the transport means to the transport starting location or locations is terminated or not even commenced and, in addition, the subset of transport means is cancelled, namely, preferably in the central control unit or in the memory unit thereof.

In the scope of another embodiment of the invention, it is provided that the transport means included in the subset of transport means jointly pick up and/or raise the load. In particular, this is the case when the transport means are conveyed to the same transport starting location, that is, the load to be picked up is present in full at the transport starting location or at least the part of the load that is to be picked up is present there. Depending on the load, it may be necessary to use a plurality of transport means in order to be able to transport the load. The load is therefore jointly picked up by a plurality of transport means. In this case, it can be provided that the load is picked up jointly by the plurality of transport means in order to subsequently transport it.

Another embodiment of the invention provides that, at least during the transport, the transport means that jointly pick up and/or raise the load autonomously keep constant a distance lying between them or are coupled to one another, in particular mechanically, magnetically, and/or pneumatically. In this way, it is provided that the transport means not only jointly pick up or raise the load, but, in addition, also jointly carry out the transport of the load from the transport starting location to the transport destination location.

During the transport, the transport means shall keep the distance lying between them constant, wherein they are preferably spaced apart from one another, that is, are not directly connected to one another. In this case, a connection between the transport means is exclusively provided via the load and/or the undersurface on which the transport means move. In order to keep the distance constant, the transport means or at least one of the transport means is/are furnished with corresponding devices, such as, for example, with at least one distance sensor, or—advantageously—with a plurality of distance sensors, which preferably have, at least in part, different alignments. The distance sensor or each of the distance sensors can be designed, for example, as an optical or acoustic distance sensor. Preferably, the transport means has distance sensors of different kind, which, in addition, are aligned identically—that is, for example, an optical distance sensor and an acoustic distance sensor.

Additionally or alternatively, it can be provided that, during the transport, the transport means are coupled to one another. In this way, it is thus provided that, after the transport starting location has been reached and prior to picking up the load or, alternatively, after picking up the load, but prior to carrying out the transport, the transport means serving for transport of the load are coupled to one another. This coupling is preferably cancelled once again after the transport destination location has been reached and, in particular, after the load has been deposited, for example, together with the cancellation of the subset of transport means. The coupling of the transport means can, for example, be carried out mechanically, magnetically, and/or pneumatically, for which purpose the transport means have corresponding devices.

Regardless of whether or not the transport means are coupled to one another and whether the distance between them is maintained autonomously, it can be provided that the transport means present in the subset of transport means move in a specific, fixed formation. The latter can be determined before the load is picked up and, in particular, as a function of the load or on the kind of load.

Another preferred embodiment of the invention provides that, for a joint transport of the load by means of a plurality of transport means, the transport means included in the subset of transport means are divided into at least one master transport means and at least one slave transport means. In this case, the master transport means takes over at least some functions of the slave transport means, which the latter, for this purpose, hands over to the master transport means. For example, the master transport means takes over the sole communication with the central control unit and further conveys instructions of the central control unit to the slave transport means.

In other words, it is provided that the subset of transport means or the transport means included in it is/are controlled, at least in part and preferably completely, by the at least one master transport means. For this purpose, the master transport means issues corresponding instructions to the slave transport means, which implements these instructions. No such instructions are transmitted in the other direction. However, the slave transport means can transmit status reports on its operating state and/or an environment monitoring, for example, to the master transport means. In this case, the environment monitoring is hereby preferably carried out by means of the already mentioned environment recognition device.

Particularly preferred, it is provided that the master transport means itself establishes a route to be traveled, or receives a route to be traveled that is transmitted from the central control unit. The master transport means further conveys the route to the slave transport means, so that said slave transport means can travel the route independently. Alternatively, it can obviously be provided that the master transport means takes on the actuation of a drive device and/or of a steering device of the at least one slave transport means and thus essentially remotely controls it.

Another preferred embodiment of the invention provides that the transport means included in the total set of transport means are to be designed or are designed identically to one another, or, designed at least in part different from one another. In this way, it can be provided that the transport means altogether are identical or have the same basic structure. This basic structure can be adapted in a specific way to the load. However, it can also be provided that the basic structure can be adapted to different kind of loads by means of an additional transport means attachment or the equivalent. For example, for this purpose, the basic structure can be supplemented by a transport means attachment that is adapted to the load or can be coupled to it.

However, it can also be provided a priori that the transport means are designed differently from one another and have different basic superstructures, which are connected to them firmly or permanently. In this way, the total set of transport means includes, for example, transport means that are adapted to the transport of a first load as well as transport means that are adapted to the transport of a second load that differs from the first load. The two loads, that is, the first load and the second load, are thereby of different types or different kinds. For example, as the first load, living beings, in particular persons, are used, and, as the second load, a transported cargo is used.

An enhancement of the invention provides that, prior to conveyance to the corresponding transport starting location, at least one of the transport means is furnished with a transport means attachment. The transport means attachment serves for the transporting or the picking up of the load. For example, for the transporting of the load, said load is arranged completely in the transport means attachment. A transport means attachment of this kind can be, for example, a transport compartment, a container, or a tank. The transport means attachment is connected to the above-described basic structure of the one ore more transport means and, in particular, is placed upon the basic structure of the one ore more transport means. It can be provided that the transport means attachment is connected to exactly one of the transport means or to a plurality of the transport means.

In the scope of a preferred embodiment of the invention, it can be provided that the transport means attachment is coupled to a plurality of transport means. In this way, the transport means attachment, which serves for the transport of the load, is transported itself by a plurality of transport means. For this purpose, the plurality of transport means jointly pick up or raise the transport means attachment. In this case, the load may already be arranged in the transport means attachment prior to being picking up or raised, or it may be arranged first afterward, that is, prior to carrying out the transport.

Another embodiment of the invention provides that the transport means attachment is selected from a large number of different transport means attachments. The transport system therefore does not have only a single kind of transport means attachment, that is, does not have only identical transport means attachments. Instead, the transport means attachments that are associated with the transport system have different designs, at least in part, and are adapted to the transport of different loads or different types of loads. For example, a part of the transport means attachments are adapted for the transport of transported cargos, and another part are adapted for the transport of living beings, in particular of persons.

Another preferred embodiment of the invention provides that, as a transport means attachment, a transport compartment or a motor vehicle mount is used. Reference to the use of a transport compartment—for example, the passenger compartment—has already been made above. The transport compartment serves, in particular, for accommodating the person or persons to be transported.

Alternatively, the motor vehicle mount can also be used as a transport means attachment. The motor vehicle mount serves for holding or taking up a motor vehicle that is to be transported. The motor vehicle mount can be formed in one piece and subsequently picked up or raised by a plurality of transport means. However, it can also be provided that each transport means uses a separate motor vehicle mount, so that the transport means are arranged at the motor vehicle spaced apart from one another.

For example, each wheel of the motor vehicle is associated with a transport means. Accordingly, by the raising of its wheels and, in particular, by simultaneous raising or successively occurring raising, the motor vehicle is raised by the transport means and can subsequently be transported. In this way, for a typical passenger automobile, four transport means are necessary for the transport of the motor vehicle.

Finally, in the scope of another embodiment of the invention, it can be provided that, after the transport, the transport means included in the subset of transport means are relocated separately and independently of one another to at least one transport starting location. After the transport starting location or locations has/have been reached by the transport means, the subset of transport means is cancelled and the transport means thus far included in the subset of transport means are identified once again as being available. Accordingly, they can be employed once again for the transport of a load. For this purpose, they can be conveyed separately and independently of one another to the at least one additional transport starting location.

For example, the transport means thus far included in the subset of transport means are relocated to different transport starting locations. However, it can also be provided that they are conveyed to the same transport starting location separately and independently of one another, wherein the transport means thus far included in the subset of transport means are a part of a newly constituted subset of transport means.

The invention obviously also relates to a transport system, in particular, for implementing the method in accordance with the preceding embodiments, wherein the transport system has a large number of transport means, which are assembled into a total set of transport means that can move independently of one another, and are, in particular, emission-free, and, when there is a transport means request at a central control unit, the system is designed, for determining from this transport means request, depending on the load to be transported, a number of transport means number that is sufficient for carrying out the transport as well as one associated transport starting location or a plurality of associated transport starting locations and for selecting from the total set of transport means a number of transport means that corresponds to this determined transport means number, for assigning them to a subset of transport means, and for autonomously conveying them to the transport starting location or locations, wherein, after the transport starting location or locations has/have been reached, the transport of the load to one transport destination location or to a plurality of transport destination locations is carried out and, after the transport destination location or locations has/have been reached by the transport means, the subset of transport means is cancelled.

Reference to the advantages of an approach of this kind or of an embodiment of the transport system of this kind has already been made. Both the transport system and the method for its operation can be further developed in accordance with the preceding statements, so that reference to said statements is made in this regard.

BRIEF DESCRIPTION OF THE DRAWING

The invention will be explained in detail below on the basis of the exemplary embodiments illustrated in the drawing, without any limitation of the invention thereby ensuing.

FIG. 1 is a flow chart of a method for operating a transport system.

FIG. 1 shows, in schematic form, a flow chart of a method for operating a transport system, which has a large number of transport means assembled into a total set of transport means. These transport means can move independently of one another and, especially preferably, are emission-free. In this case, they are, for example, electric motor vehicles or the equivalent.

In a first step 1, a transport means request arrives at a central control unit, for example, by way of an operator or a customer or, alternatively, by way of an assistance device. By means of the transport means request, it is possible, for example, to transmit data relating to the load to be transported as well as a transport starting location and a transport destination location. The load is present, for example, in the form of a motor vehicle. Accordingly, the data can comprise, for example, vehicle data of the motor vehicle, such as, for example, the type of motor vehicle.

From the type of motor vehicle, the central control unit determines key data, such as the allowed total weight, the maximum axle load, and/or the dimensions of the motor vehicle, by use of, for example, a database. It can also be provided that the data are transmitted by an assistance device of the motor vehicle itself. In this case, the operator merely actuates the assistance device of the motor vehicle, which, in turn, transmits the transport means request to the central control unit.

In a step 2, the central control unit acquires data on available transport means, which are assembled into the total set of transport means. Specific data of the individual transport means are checked here, such as, for example, the current location, the quantity of energy needed for reaching the transport starting location and the transport destination location, and the residual quantity of energy remaining to the transport means. Additionally, it can be determined whether, after the transport has been carried out, the residual energy quantity would be sufficient for reaching a maintenance device and/or charging device for the transport means.

Transport means that are already in use, that is, in particular, transport means identified as not being available, can be employed in the case that, at a specific point in time, they are located in the vicinity of the transport starting location and meet the further requirements. The specific point in time is thereby, in particular, the time of arrival of the other transport means at their respective transport starting locations.

In a step 3, the central control unit establishes the number of transport means sufficient for carrying out the transport as a function of the load that is to be transported, and assembles a subset of transport means that contains a number of transport means corresponding to this determined transport means number. Subsequently, the transport means assigned to the subset of transport means are autonomously conveyed to the transport starting location or the conveyance is at least begun.

Subsequently, in a step 4, a confirmation request is made, wherein, when the confirmation request is followed by a confirmation, the transport means are actually conveyed to the transport starting location. If the confirmation is absent or if an active cancellation occurs, then the subset of transport means is once again cancelled and the transport means included in it are conveyed to other uses.

The actual conveyance of the transport means included in the subset of transport means is undertaken in a step 5. This means that, in the scope of the step 5, the transport means actually reach the transport starting location.

In a step 6, after the transport starting location has been reached by the transport means, the load, that is, for example, the motor vehicle, is picked up and a static assembly is formed from the individual transport means. This assembly and the distances existing between the transport means of the assembly are adjusted, for example, by a direct communication of the transport means with one another and, in particular, controlled and/or regulated.

In a step 7, the transport means are used for transporting the load to the transport destination location. Here, they move within the static or closed assembly, the dimensions of which are calculated individually on the basis of the separating distances of the transport means within the assembly, the dimensions of the load, and the dimensions of the transport means. These dimensions can be employed as input values for a navigation or route guidance of the transport means. Especially preferred, the transport means are equipped with a communication device for communication with the motor vehicle that is to be transported. For example, in this case, the transport means actuate a signal system of the motor vehicle, such as, for example, a system indicating the direction of travel and/or a braking indicator system. For this purpose, a connection, such as, for example, a wired or wireless connection, can be established.

In a step 8, the transport means arrive together with the load at the transport destination location. Subsequently, the load is unloaded and the subset of transport means is cancelled. The unloading occurs preferably only once a transport confirmation is received at the central control unit, which, for example, is triggered or is to be triggered by the operator. Obviously, it can also be provided that the step 8 is already triggered early on, that is, before the transport destination location has been reached, in particular in that the operator and/or the assistance device terminate or terminates the transport prematurely. In this case, the transport is already terminated before the transport destination location has been reached and the load has been unloaded from the transport means.

The described method for describing the transport system can be utilized in an extremely flexible manner. In addition, the transport system can be put together in a very modular manner and can be composed of identical or different transport means.

The invention claimed is:

1. A method for operating a transport system for transporting a passenger motor vehicle, the method comprising:
assembling, based upon a received transport means request, a plurality of transport means into a total set of transport means, wherein each transport means of the plurality of transport means is an electric motor vehicle configured to move independently of one another and a subset of transport means of the total set of transport means is configured to transport the passenger motor vehicle;
determining a number of transport means of the total set of transport means sufficient for carrying out the transport means request depending on a type, a volume, or a weight of the passenger motor vehicle to be transported and one or more transport starting locations;
selecting from the total set of transport means, the subset of transport means corresponding to the determined transport means number, wherein, selecting each transport means for the subset of transport means includes:
comparing a quantity of energy needed for reaching one or more transport destination locations with a remaining residual quantity of energy of the respective transport means of the subset of transport means to determine whether each transport means of the subset of transport means has a sufficient residual quantity of energy;
exchanging energy from a transport means of the subset of transport means with the sufficient residual quantity of energy to charge a transport means of the subset of transport means that does not have the sufficient residual quantity of energy;

evaluating a suitability of each transport means of the subset of transport means including determining a distance of the one or more transport destination locations from a charging device for the respective transport means, wherein respective transport means are only assigned to the subset of transport means when the quantity of energy needed for reaching the one or more transport destination locations is less than the remaining residual quantity of energy of the respective transport means;

and identifying an availability of each transport means of the subset of transport means, wherein each transport means is available after the transport means is not assigned to a pre-existing subset of transport means;

calculating and displaying a time of arrival of the subset of transport means at the one or more transport starting locations based on a time of arrival of each transport means of the subset of transport means;

autonomously conveying the subset of transport means to the one or more transport starting locations;

after the one or more transport starting locations are reached, transporting the passenger motor vehicle, by the subset of transport means, to one or more transport destination locations; and after the one or more transport destination locations have been reached by the subset of transport means, canceling the subset of transport means.

2. The method according to claim 1, wherein the subset of transport means jointly pick up and raise the passenger motor vehicle.

3. The method according to claim 2, wherein, at least during the transport, the subset of transport means jointly pick up and raise the passenger motor vehicle autonomously and keep a constant distance between them.

4. The method of claim 1, wherein suitability of the subset of transport means is evaluated based on a type of the passenger motor vehicle.

5. The method of claim 4, wherein the type of the passenger motor vehicle is used to determine at least one of an allowed total weight, a maximum axle load, and dimensions of the passenger motor vehicle.

6. The method according to claim 1, wherein the transport means request specifies the passenger motor vehicle to be transported, the one or more transport starting locations, and the one or more transport destination locations.

7. The method according to claim 1, wherein, prior to the conveyance of the subset of transport means to the one or more transport starting locations, a confirmation request is carried out, wherein, when a confirmation follows the confirmation request, the subset of the transport means is conveyed to the one or more transport starting locations and, otherwise, the subset of transport means is canceled.

8. The method according to claim 1, wherein, after the transport, the subset of transport means is relocated separately and independently of one another to at least one further transport starting location.

9. The method of claim 1, wherein each wheel of the passenger motor vehicle is associated with a different transport means of the subset of transport means.

10. The method of claim 2, wherein, after jointly picking up and raising the passenger motor vehicle, the subset of transport means forms a static assembly.

11. The method of claim 1, wherein each transport means is configured to perform an energy exchange with the passenger motor vehicle.

* * * * *